United States Patent [19]

Swaney et al.

[11] Patent Number: 4,482,951
[45] Date of Patent: Nov. 13, 1984

[54] DIRECT MEMORY ACCESS METHOD FOR USE WITH A MULTIPLEXED DATA BUS

[75] Inventors: Richard E. Swaney; William D. Long, both of Fullerton, Calif.

[73] Assignee: Hughes Aircraft Company, El Segundo, Calif.

[21] Appl. No.: 320,244

[22] Filed: Nov. 12, 1981

[51] Int. Cl.³ .................... G06F 3/04; G06F 15/16
[52] U.S. Cl. ............................ 364/200; 364/300
[58] Field of Search ... 364/200 MS File, 900 MS File, 364/300

[56] References Cited

U.S. PATENT DOCUMENTS

| | | | |
|---|---|---|---|
| 3,710,324 | 1/1973 | Cohen et al. | 364/200 |
| 4,075,691 | 2/1978 | Davis et al. | 364/200 |
| 4,084,228 | 4/1978 | Dufond et al. | 364/200 |
| 4,130,865 | 12/1978 | Heart et al. | 364/200 |
| 4,173,783 | 11/1979 | Couleur et al. | 364/200 |
| 4,228,496 | 10/1980 | Katzman et al. | 364/200 |
| 4,371,932 | 2/1983 | Dinwiddio et al. | 364/200 |

*Primary Examiner*—Jerry Smith
*Assistant Examiner*—William G. Niessen
*Attorney, Agent, or Firm*—Earnest F. Oberheim; Anthony W. Karambelas

[57] ABSTRACT

A method for use with a computer which directly transfers incoming data into the computer memory. A functional address contained in a received message is used to index a pointer in a vector table. The indexed pointer addresses an input control block associated with the functional address. The input control block is used to control the flow of data into the computer memory. The input control block also controls access to the computer memory for subsequent messages having the same functional address.

8 Claims, 8 Drawing Figures

DIRECT MEMORY ACCESS METHOD FOR USE WITH A MULTIPLEXED DATA BUS

BACKGROUND OF THE INVENTION

The present invention relates generally to multiplexed data buses, and more particularly, to a direct memory access method for storing messages received from a multiplexed data bus.

In present ground command, control, communications, and intelligence information systems, the traditional hierarachical architecture under control of a central computer results in an inflexible system configuration. A large percentage of the system development, procurement, and maintenance costs of such systems are attributable to interface circuitry, cables, and connectors, and the like. Typical system specifications require a system architecture capable of continued operation during the failure and repair of individual units, and during operational reconfiguration of the system. This necessitates an interconnect structure containing no critical nodes or central control elements. These requirements may be met by utilizing an interconnect system employing a data bus which is shared by all units which comprises a standard bus interface in each unit.

In a conventional large scale system, the interconnection of computers, processors, displays, and peripheral units requires a unique hierarchical arrangement where the function of a unit is determined by its position in the interconnecting topology. Moreover, the associated interfaces of any one type of unit would change, depending on its location in the topology. The conventional system contains a central computer connected to mini-computers through interface units, which in turn communicate with peripherals, displays and communications equipment by way of specialized controllers.

To ensure continuous operation when unit failures occur, the conventional system is redundant, in that a plurality of complete systems are provided to compensate for unit failure. As the number of units in the system increases, the number of point to point interconnections increases at a greater rate and so do the necessary interface units, cards, and cables. The configuration of the interconnecting elements in the topology may vary from system to system, and hence integration of these various systems is most complex.

To circumvent some of the problems associated with this conventional type of system, a single multiplexed data bus may be employed interconnecting each of the units in the system. The central computer may be eliminated by utilizing distributed processing. The computer units are required to interface only with the data bus. Any computer may perform any role in the system since each computer is connected directly to all other computers, peripherals and displays by way of the multiplexed data bus. Continued operation during the failure of a unit only requires an additional backup unit. The result is reduction in the types and numbers of units in the system, and the number of interface cards per unit. As a result, acquisition and life cycle costs are reduced because inventory and maintenance requirements are alleviated.

When using a single multiplexed data bus, a computer's bus interface may accept messages addressed to it from any unit coupled to the bus, at any time. Since these messages are not solicited by the computer attached to the addressed bus interface, the arrival time and source of the message cannot be determined prior to the acceptance of the message from the bus. When two or more back-to-back messages are addressed to the same computer, the inter-message gap does not allow enough time for a computer to store the received messages using conventional storage techniques. Such conventional techniques include execution of a interrupt receiver routine followed by an input-output driver routine.

The conventional approach is to queue incoming messages before transfer into the computer memory. This requires excess high-speed buffer capacity. Since the inter-arrival rate and length of messages is indeterminate, the probability of buffer overflow increases as the bit rate capacity of the data bus increases. Also, conventional systems utilize considerable processing overhead in moving received messages from one location in memory (buffer area) to another location (work area).

Several techniques are presently used in existing conventional data bus designs to transfer messages into computer memory. One method provides for received messages to be stored in a fixed location in a computer memory whereafter software is required to move the stored messages prior to receipt of additional incoming messages. Otherwise, the newly incoming messages would overwrite the previously received messages, and thus disrupt data flow. Another technique provides for buffering of one or more messages in an external memory. When the buffer is full the overflowing messages and subsequently received messages are lost. The message source is informed of the loss of transmitted messages and directed to retransmit after a time delay. A third technique provides for transmission of a control word which reserves space in memory prior to transmission of the data message. This insures that the proper amount of memory space is allocated for the message to be transmitted. However, this method requires the transmission of several messages to store data. This method also requires processing time to set up a storage area for the data, which slows down operational speed.

Therefore, it would be an improvement in the data processing art to have a method of directly storing received messages in a computer's memory in the appropriate processing area so as to avoid the unnecessary movement of messages in memory from an incoming buffer area to a processing area.

It would also be an improvement in the art to provide a method which avoids the need to delay reception of messages while the computer prepares and sets up for reception of the message.

SUMMARY OF THE INVENTION

In order to overcome the problems existing in prior art memory access methods, the present invention provides for a method of direct memory access which does not disrupt ongoing computer processing. The method may be employed with a distributed control, multiplexed data bus having a plurality of data processing units coupled thereto.

The method provides for directly addressing memory of a data processing unit to store a received message at a predetermined location within that memory. A functional address contained in the received message is used to direct the storage of the message in the memory. Each data processing unit contains a unique set of software functions (programs) which process the data contained in a received message during their execution. The functional address identifies the software function which uses the data contained in the received message. Each software function is activated by receipt of a message containing the functional address corresponding to that particular software function.

A software function is written in a manner which establishes an input control block and a vector table which are used to direct the storage of a received message in a predetermined area of the memory. The input control block and vector table provide the necessary control words and pointers which allow the continued operation of the software function once data has been received.

The received message is comprised of the functional address and data words. The functional address identifies the software function which is to utilize the data. This functional address is used by a direct memory access (DMA) controller to address the vector table. The vector table points to the input control block designated by the addressed word. The DMA controller uses the vector table and input control block to determine from the functional address where to store the data words contained in the received message.

The vector table is a stored set of predetermined locations of input control blocks which are accessed by the DMA controller. The input control block is a stored set of command words which assist the DMA controller in determining where to store data in the memory.

The method of the present invention, comprises receiving a message containing the functional address. Another operation, not associated with the present method, determines whether or not the message should be accepted by this unit. This operation is described in a copending patent application entitled "Functional Addressing Method for a Multiplexed Data Bus", Ser. No. 307,970, filed Oct. 2, 1981. Once it is determined that the message is to be accepted by the unit, the functional address contained in the message is used in the present method as an index the the vector table. The indexed location in the vector table points to an input control block which has been designated for use by that particular functional address. The data words contained in the message are then transferred by the DMA controller into the memory location indicated by the input control block.

In order to implement the present method, the data processing unit includes a bus interface, a DMA controller, a processor and a memory. The DMA controller uses the vector table and an input control block to transfer a message received from the bus interface into the memory. The message is comprised of a beginning of message word containing the functional address, followed by the data words, and terminated with an end of message word.

When the bus interface accepts a message from the data bus, the DMA controller transfers the message into the memory utilizing the functional address contained in the beginning of message word. The functional address indexes an entry in the vector table. The entry in the vector table in turn identifies an input control block associated with that particular functional address. The input control block contains command words utilized by the DMA controller for the purpose of storing the data in the memory. The functional address also corresponds to the software function which is to process the received data.

The first data word in the message is stored in a predetermined memory location determined by a word in the input control block. Subsequent words of the message are stored in memory locations contiguous to the first memory location until the last word of the message is received. Alternatively, storing continues until a maximum number of words have been received which fills the allocated memory area.

The DMA controller, by way of the input control block, limits the size of the memory area used for storing a particular message, and stores an indication of the length of the received message for use by the software function. The input control block provides an input to the vector table to update the control block index provided thereby. This action allows the DMA controller to identify the next input control block to be used for the same functional address. The end of message word is stored in an input message termination queue located in the memory, to indicate to the software function that data has been stored.

Employing the above-described method allows for direct access to a memory in a data processing unit without disrupting ongoing software execution. The above method allows for direct memory access, which ensures that the processing unit is capable of receiving messages as fast as they are received over the data bus. This method reduces processing overhead in the processing unit and avoids unnecessary movement of messages from an incoming buffer area to a processing area. This method also eliminates the need to delay reception of a message while the processing unit sets up an area to receive the incoming data.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
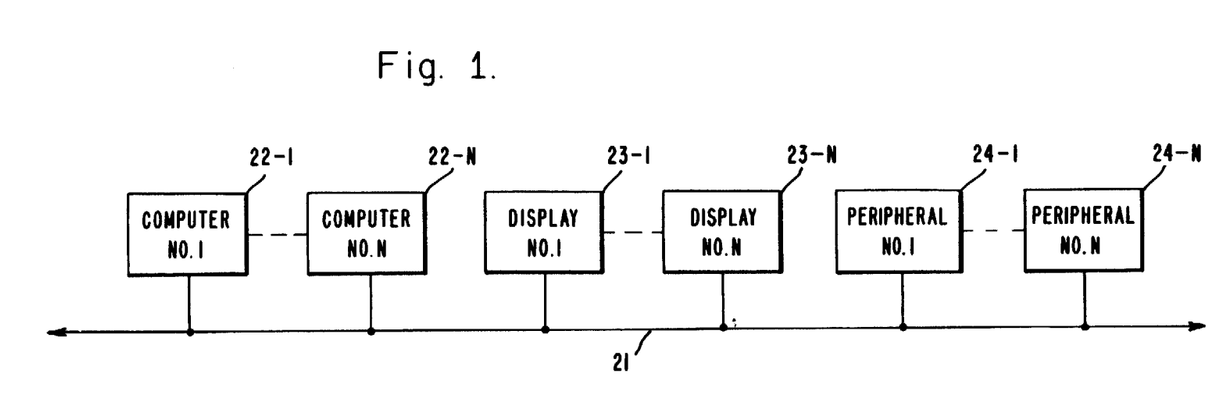
FIG. 1 shows distributed control, multiplexed data bus which may employ the method of the present invention.

Referring to FIG. 1 there is shown a multiplexed data bus in which the present invention may be employed. The system includes a serial data bus 21 to which is coupled a plurality of units, such as computers, displays and peripherals. For example, a plurality of computers 22-1, . . . 22-N, a plurality of displays 23-1, . . . 23-N, and a plurality of peripherals 24-1, . . . 24-N may be connected to the data bus 21. The data bus 21 may be a typical coaxial or triaxial cable with a center conductor surrounded by one or two grounded shields and appropriate transformer couplings provided in order to connect the computers, displays and peripherals thereto. The computers 22 connected to the data bus 21 may be of the same or dissimilar type. The displays 23 may be text, graphics, or large screen, or the like. The peripherals 24 include such items as terminals (CRT/keyboards), modems, printers, disks, and magnetic tapes, or the like.

Each of the units connected to the data bus 21 transmits information along the bus 21 to any of the other units. For example, the first computer 22-1 may transmit information to any of the other computers coupled to the bus 21, or transmit information to any of the peripherals 24, or any of the displays 23. In a large system configuration, it is possible for several units to transmit data along the data bus 21 to one unit at substantially the same time. A properly designed system allows for the receipt of a series of messages having little or no gap therebetween without the loss of any data.

Figure 2:
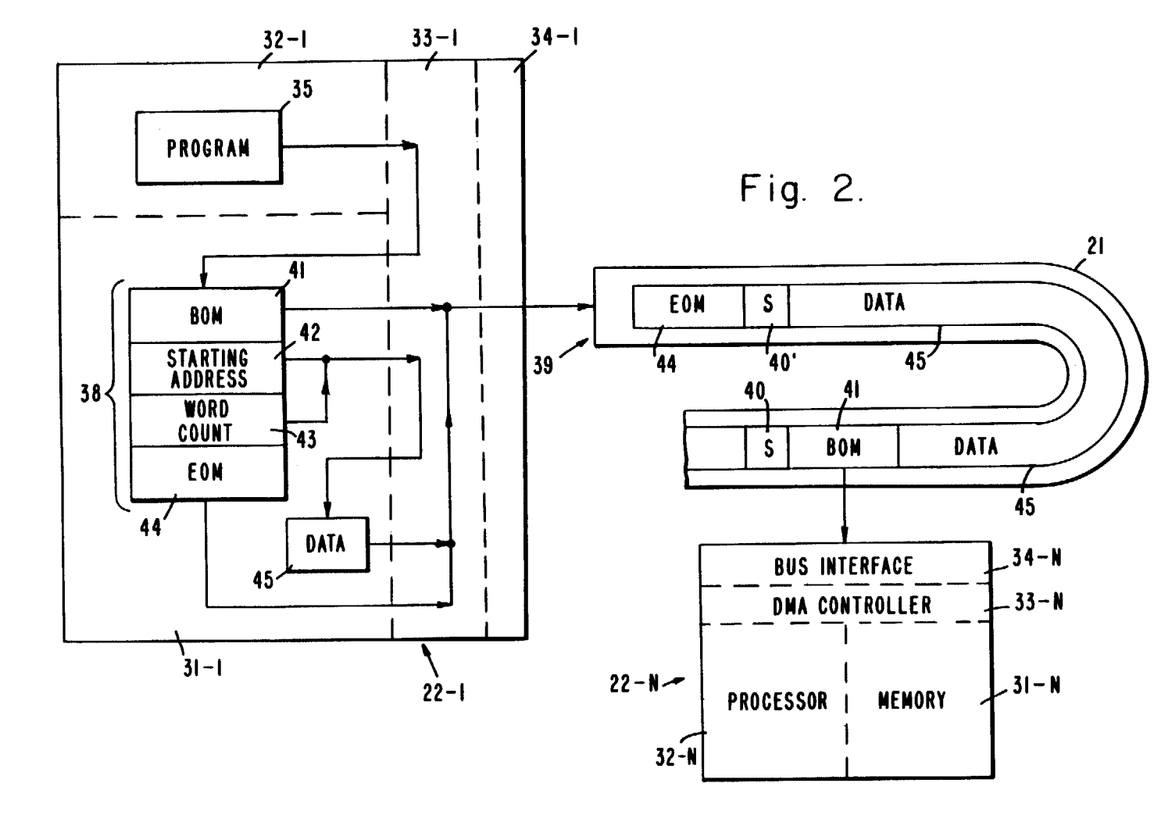
FIG. 2 illustrates the process of generating a message which is transferred over the data bus.

Referring to FIG. 2, the process by which a message is generated in a typical transmitting unit is illustrated. A computer, such as the first computer 22-1, is comprised of a memory 31-1, a processor 32-1, a direct memory access (DMA) controller 33-1, and a bus interface 34-1. The processor 32-1 executes a program 35, and an input/output instruction gives the DMA controller 33-1 the location of an output control block 38 maintained in the memory 31-1. When the bus interface 34-1 transmits a message 39 on the data bus 21, the message 39 starts with a sync pulse (S) 40, followed by a beginning of message word (BOM) 41, data words 45, a second sync pulse (S) 40′, and an end of message (EOM) word 44.

The DMA controller 33-1 retrieves the beginning of message word 41 from the output control block 38 to form the first portion of the message 39. Next, the DMA controller 33-1 retrieves the starting address 42 from the output control block 38. The starting address 42 indicates where the data words 45 are stored in the memory 31-1 and how many data words (word count 43) should be transmitted. Following the beginning of message word 41, the bus interface 34-1 retrieves the data words 45 from the memory 31-1. Finally, the DMA controller 33-1 retrieves the end of message word 44 from the output control block 38 to form the last portion of the message 39.

The message 39 is received by a particular data processing unit, identified as computer 22-N. The bus interface 34-N of the receiving computer 22-N receives the transmitted message 39 and determines if this particular unit is to accept the transmitted data contained therein. For clarity, FIG. 6 also shows the structure of the received message 39. In particular, the message 39 includes the first sync pulse 40 followed by the beginning of message word 41 which contains a type code 50 and a functional address 49. The data words 45 follow the beginning of message word 41. The second sync pulse 40′ follows the data words 45, whereafter the end of message word 44 terminates the message 39.

Figure 4:
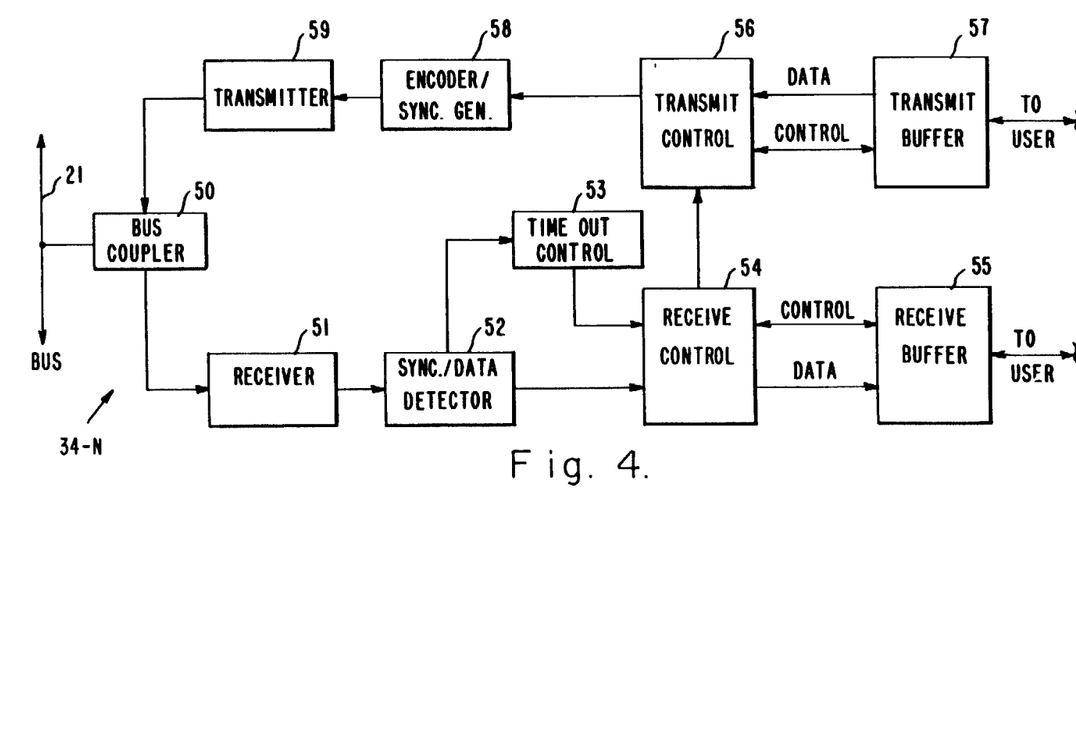
FIG. 4 illustrates a typical bus interface.

The composite message 39 is received by all bus interfaces which individually determine if the attached unit is to accept the transmitted data contained therein. FIG. 4 shows a block diagram of a typical bus interface circuit 34-N. The bus interface circuit 34-N is coupled to the transmission line of the data bus 21 through a bus coupler 50, which is generally comprised of an isolation transformer which presents a high impedance, short stub to the transmission line. The bus interface circuit 34-N is split into two basic portions, receiver portion and transmitter portion. The bus coupler 50 is connected to a receiver 51 which allows the receiver 51 to sense signals as they propagate past the coupler 50 on the data bus 21. The sensed signal is amplified and conditioned by the receiver 51 and applied to the sync/data detector 52. The presence of a sync pulse in an incoming signal is detected by sync/data detector 52 which converts the bits of information following the sync pulse from an encoded waveform to a decoded sserial bit stream. A serial-to-parallel converter in the sync/data detector 52 converts the serial bit stream into parallel words which are presented to receive control circuitry 54 for interpretation.

The receive control circuitry 54 distinguishes control words from data words and decodes control words. If the control word is a beginning of message word, the receive control circuitry 54 determines whether to accept or reject the message. The sync detector 52 is also coupled to timeout control circuitry 53 and provides a signal indicative of when units are transmitting over the bus. The timeout control circuitry 53 monitors the data bus 21 for time periods when the bus is inactive, and provides appropriate signals to the receive control circuitry 54.

The transmitter portion of the bus interface comprises transmit control circuitry 56 and transmit buffer circuitry 57 which controls the data flow from the user. An encoder/sync generator 58 converts parallel words from the user into a serial bit stream, encodes the waveform of the bit stream, and interjects sync pulses into the signals to be transmitted. The output of the encoder/sync generator 58 is connected through a transmitter 59 to the bus. The transmitter 59 transmits the signal over the data bus 21 by way of the bus coupler 50.

The receive control circuitry 54 maintains one or more receive addresses or function codes and compares the data message function address of all received messages against its receive address(es) or function code(s) to determine whether to accept or reject the message. When a message is accepted, the receive control circuitry 54 controls the flow of the data words to the user (computer, terminal, etc.) through receive buffer circuitry 55.

Figure 3:
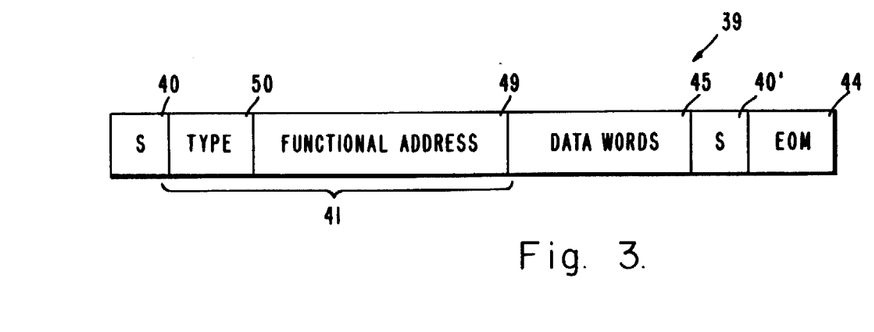
FIG. 3 shows the make-up of a typical message which is transmitted over the data bus.

Referring again to FIG. 2, in order to determine whether the data 45 is to be accepted by the unit 22-N, the beginning portion of the composite message 39 is comprised of the sync pulse 40, followed by a beginning of message word 41 which includes a function code or address 49 and word type code 50, FIG. 3. The function code or address is a 12-bit word having a predetermined pattern of ones and zeros which identify a particular function or process to receive the data. The function code or address 49 addresses a 4k by 1 bit random access memory (RAM) 61 (see FIG. 5) in the bus interface 34 of every unit 22, 23, 24 (FIG. 1) coupled to the data bus 21 to determine if that unit contains the receiving function by reading a bit from the RAM 61. If the bit addressed by the function code 49 in RAM 61 is read out as a 'one', the transmitted message 39 is accepted and passed to the attached point. However if the bit addressed by the function code 49 in RAM 61 is read out as a 'zero', then the bus interface 34-N rejects the transmitted composite message 39.

Figure 5:
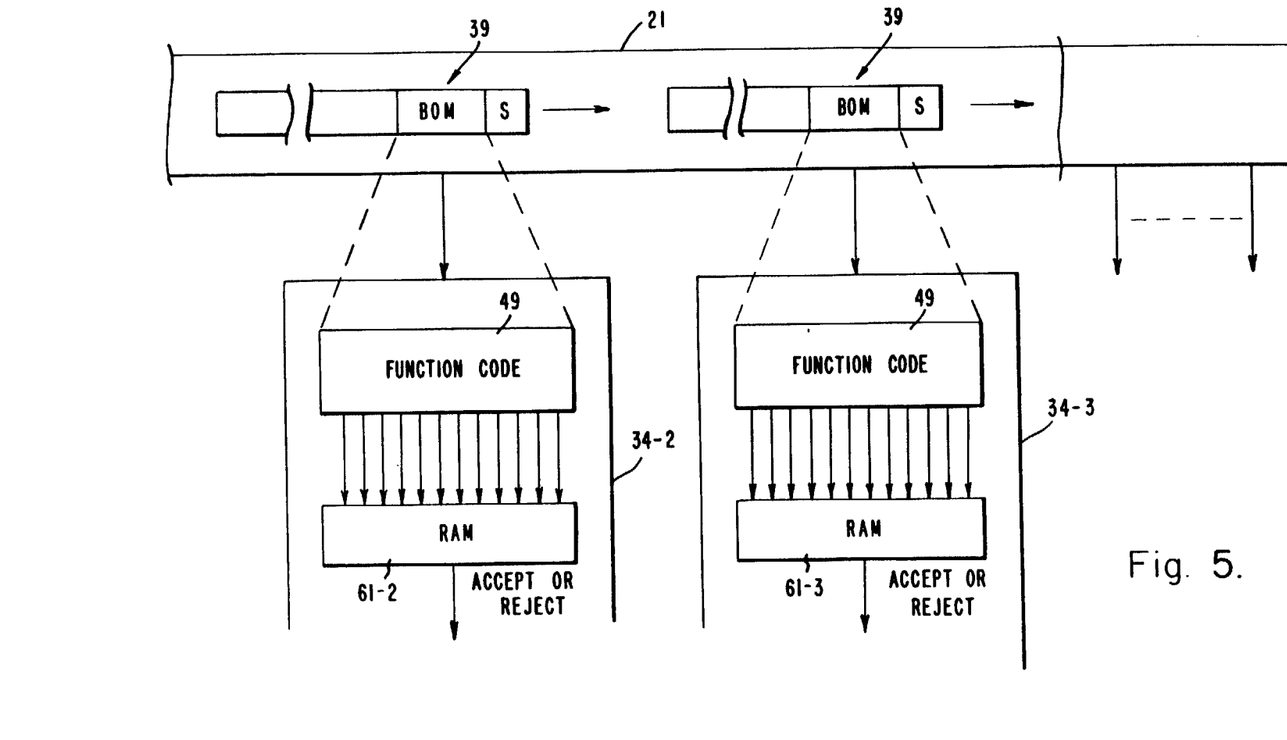
FIG. 5 illustrates the operation of functional addressing.

Referring to FIG. 5 there is shown the data bus 21 having the composite message 39 transmitted therealong. The beginning of message signal 41, which is a portion of the composite message 39 is accepted by the bus interfaces 34-2, 34-3 of two of two of the units 22-2, 22-3 coupled to the data bus 21. The function code 49 is received by each of the bus interfaces 34-2, 34-3 of these units 22-2, 22-3, and applied to separate random access memories 61-2, 61-3. A comparison of the function code or address 49 in the random access memories 61-2, 61-3 generates output signals which indicate either to accept or reject the transmitted message 39.

When a message 39 is transmitted along the data bus 21, all bus interfaces receive the message and use the function code or address 49 in the beginning of message sighal 41 as a memory address for a memory read operation in the random access memory 61. The programming of a particular RAM 61-2 in a particular bus interface 34-2 determines if that particular bus interface 34-2 accepts or rejects that message 39. For example, the RAMs may be programmed so that all bus interfaces reading a 'zero' reject the message 39 while all bus interfaces reading a 'one' accept and pass the message to its attached unit. Using a 12-bit function code as shown allows each bus interface unit to recognize up to 4096 functional addresses.

The particular functional addresses which may be recognized by a particular bus interface unit may be changed by transmitting a control message over the data bus 21 or sending a message directly from a user interface to a particular function code RAM. Each word of this control message may contain a function code or address and a single bit of information which indicates where to accept or reject messages with that function code or address. The function code or address in each control word may be used as a memory address for a memory write operation. The particular information bit is then written into the function code RAM. This operation updates the contents of the memory with new routing information. Thus, different functional addresses control which units receive messages as determined by the updated contents of the memory.

Figure 6:
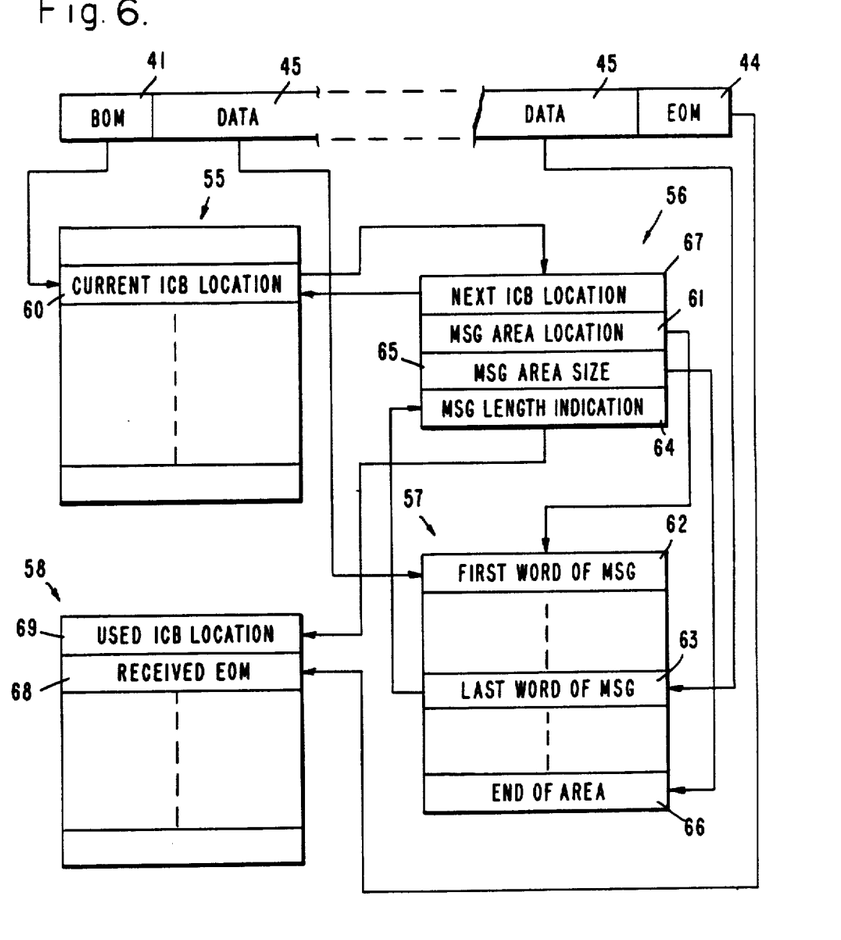
FIG. 6 shows a diagram which may be employed to illustrate the method of the present invention.

Referring to FIG. 6, a diagram useful in illustrating the method of the present invention is shown. The method of the present invention allows for a direct addressing of a computer memory to store messages therein. As was explained hereinabove, the message 39 contains a functional address 49 (FIG. 3) near the beginning thereof. Once a particular bus interface 34 accepts the message 39, the functional address 49 is used by the DMA controller 33 as an index in a vector (pointer) table 55. The address in the vector table 55 points to an input control block (ICB) 56 corresponding to that particular functional address 49. The vector table 55 is a stored set of predetermined memory locations of input control blocks 56 which are accessed by the DMA controller 33. The input control block 56 is a stored set of command words which assist the DMA controller 33 in determining where to store received data. The information stored in the input control block 56 indicates where to store the data 45 in the memory 31, whether or not to interrupt the processor 32 after the data 45 is stored, and how to set up for the next incoming message 39 with the same functional address 49.

With particular reference to FIG. 6, the message 39 is shown delineating the various portions thereof which are of particular importance to the method of the present invention. A software function (program) which is executed in the data processing unit 22-N is written in a manner which establishes the input control block 56 and vector table 55 used to direct the storage of a received message 39 in the memory. The functional address 49 contained in the message 39 is utilized by the DMA controller 33 to index the vector table 55. The functional address 49 is applied to the vector table 55 which identifies the location 60 of a particular input control block, such as input control block 56. The input control block 56 is one which is designated for a particular functional address 49.

Once identified, the DMA controller 33 uses the input control block 56 to control the flow of data 45 from the received message 39 into an input message area 57 of the memory 31. The DMA controller 33 stores the first data word of the message 39 at a first memory location 62 in the input message area of memory 31 which is identified by a control word labled message (MSG) area location 61 in the input control block 56. The DMA controller 33 continues to transfer data from the message 39 into the input message area 57 of memory 31 in contiguous memory locations until the last word 63 of the message 39 has been received. The end of message word 44 is detected which causes the DMA controller 33 to store the end of message word 44 in a memory location 68 of an input message termination queue 58 and terminate the transfer of data words into the input message area 57. The DMA controller 33 also directs the storage of information regarding the length of the received message in a memory location 64 of the input control block 56 so that the software function which utilizes the data 45 has an indication of where the message ends, that is, the location of the end of the message.

Normally, the number of data words 45 in a received message 39 is equal to or less than the size of the input message area 57 of the memory 31. However, if the number of words of data 45 contained in the received message 39 are greater than the number of words contained in the input message area 57 of the memory 31, the DMA controller 33 continues to store data in the input message area 57 only until the area 57 is full. The DMA controller 33 uses the information stored in memory location 65 to determine the end of the area 57. The DMA controller 33 stops directing the storage of data when it reaches the END OF AREA word in memory location 66. The DMA controller 33 discontinues directing the storage of received data words if the message exceeds the size of the input message area 57. As mentioned before, information regarding the length of the received message 39 is stored in the input control block 56 by the DMA controller 33, and the end of message word 44 is stored in the input message termination queue 58. In both cases, the location of the used input control block 56 is stored in the input message termination queue 58 by the DMA controller 33. This action assists the software function in determining if the message 39 has been received and which control block was employed to store the data 45.

The DMA controller 33 stores words in the input message termination queue 58 designating the memory location 69 as an indication of the used input control block 56, and the memory location 68 as the end of message (EOM) word 44 for each received message 39. The input termination queue 58 is continually updated wherein the oldest entry is destroyed upon arrival of the newest entry. The input message termination queue 58 keeps a history of previously received messages in terms of the particular input control block used to store the message and the end of message word.

The word in the input control block 56, which is identified as next input control block (ICB) location 67 is stored in the vector table 55 by the DMA controller 33. This ensures that the next message with the same functional address has a valid index (pointer) for control of the storage of data contained therein. This allows for multiple input control blocks to be chained together or the same input control block to be continuously used.

The implementation described with reference to FIG. 6 avoids the unnecessary movement of messages in memory from an incoming buffer area to a processing area. The need to delay reception of the message while the processor gets set up to receive it is also avoided. Direct storing of the message by use of the functional address eliminates the need for the processor to sort out messages. This system also allows an incoming message to directly update a data base file on a periodic basis without creating processing overhead or system interrupts.

Figure 7:
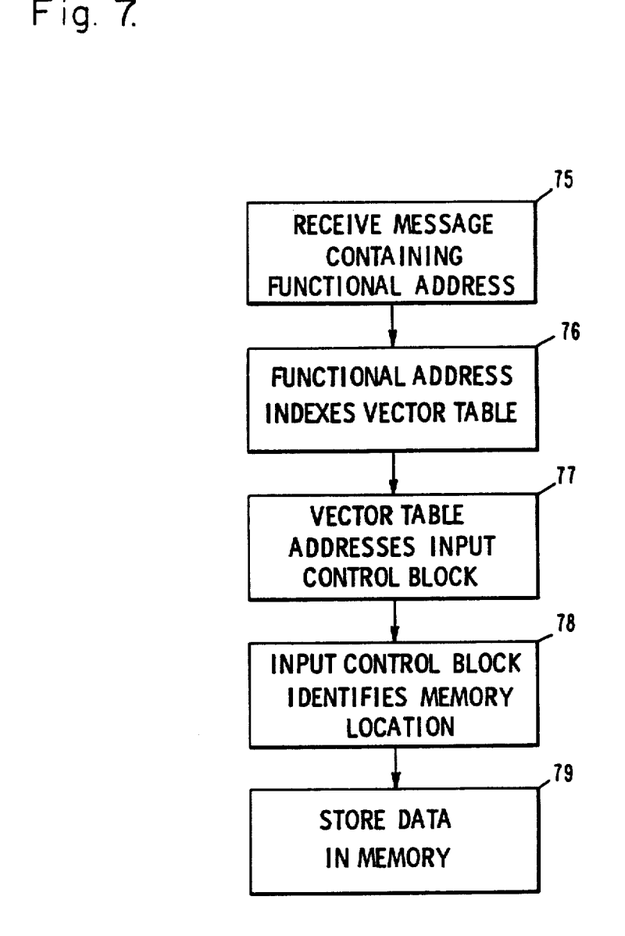
FIGS. 7 and 8 show flow diagrams illustrating the method of the present invention.

Referring to FIG. 7, the general method of the present invention is shown in flow diagram form. In particular, the method comprises the steps of receiving a message containing a functional address transmitted along a data bus, as indicated in box 75. The functional address contained in the received message is used to index a vector table, as indicated in box 76. The vector table so addressed provides the address of an input control block corresponding to the functional address, as indicated in box 77. The the input control block indicates the memory location for the storage of data contained in the received message, as indicated by box 78. Finally, the data contained in the message is stored in the memory location, as indicated in box 79.

Figure 8:
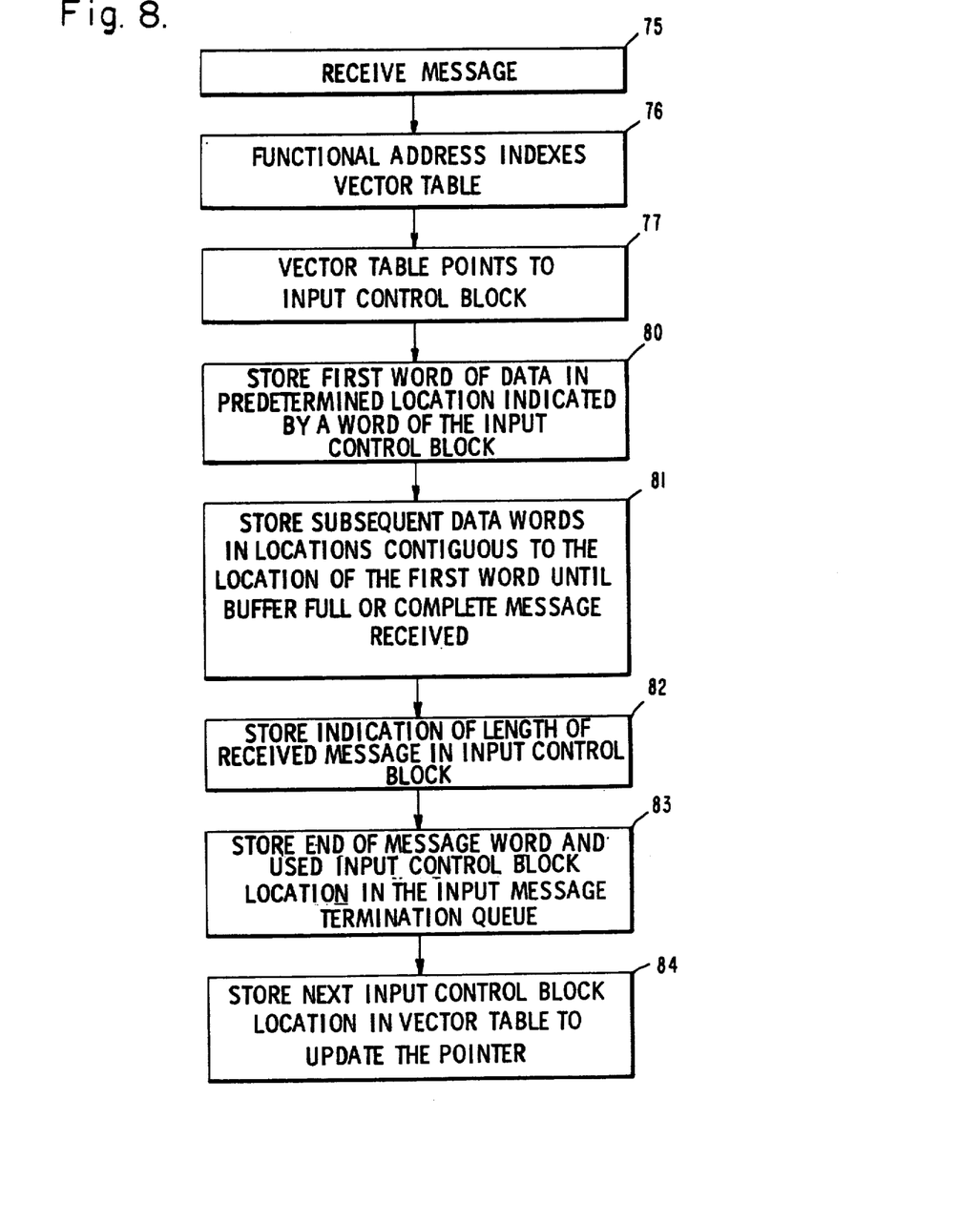

A more detailed understanding of the method of the present invention will be obtained with reference to FIG. 8. The detailed steps in the method of the present invention include receiving the message from the bus interface, which includes accepting the message and passing the functional address to the DMA controller, identified by box 75. The DMA controller utilizes the functional address for indexing the vector table, as indicated in box 76. The vector table addresses (points to) an input control block which contains information indicating where to store the data, as indicated in box 77. The DMA controller stores the first word of the data contained in the message at the predetermined location indicated by a word in the input control block, as indicated in box 80. Subsequent data words of the message are stored in memory locations contiguous to the first word, until the storage area is full or the complete message has been stored, as indicated in box 81.

Also, an indication of the length of the received message is stored in the input control block, to provide the software function using the data an indication of where the data ends, as indicated in box 82. The end of message word and the location of the input control block used to store data is stored in a message termination queue, to indicate to the software function that the data has been stored, as indicated in box 83. Also, the location of the next input control block to be used when the next message with the same functional address is received, is stored in the vector table, as indicated in block 84. The last step allows for multiple input control blocks to be chained together or the same input control block to be continuously used.

Thus, there has been described a new method for using direct memory access to store messages received from data processing units coupled to a multiplexed data bus. The present method avoids the unnecessary movement of messages in memory from an incoming buffer area. Also, the present method avoids the need to delay reception of incoming messages while a computer prepares for reception and storage of the messages.

It is to be understood that the above-described embodiment is merely illustrative of one of the many specific embodiments which represent applications of the principles of the present invention. Clearly, numerous and varied other arragements may be readily devised by those skilled in the art without departing from the spirit and scope of the invention.

What is claimed is:

1. A method for use with a multiplexed data bus having a plurality of data processing units coupled thereto which provides for direct addressing of respective computer memories associated with each of said data processing units to store received data messages therein, said data processing units including a vector table and an input control block which are established by software functions executed by said data processing units, said data message comprising a functional address identifying a data processing function to be performed on data in said data message and data to be transferred into said memory, said method comprising:

receiving said data message containing said functional address;

using said functional address as an index in said vector table, said functional address pointing to an input control block corresponding to that particular functional address;

addressing said input control block designated by said functional address;

utilizing said input control block to designate a computer meory location where data in a received data message is to be stored; and storing said data contained in said received data message in said computer memory location designated by said input control block.

2. The method of claim 1 which further comprises:

updating said vector table with information derived from said input control block which is indicative of the location of an input control block which is to be used with the next data message containing said functional address.

3. The method of claim 1 or 2 which further comprises:

storing information which is indicative of the length of said data message for use by said software function.

4. The method of claim 1, 2 or 3 which further comprises:

storing information indicative of which input control block was used to store said received data message.

5. The method of claim 1, 2, 3 or 4 which further comprises the:

storing information which is indicative of whether the message has been received.

6. A method for use with a multiplexed data bus having a plurality of data processing units coupled thereto, which provides for the transfer of data messages received by a data processing unit directly into a memory associated therewith, said memory comprising a vector table, an input block containing command words, an input message area and an input message termination queue, said data message comprising a beginning of message word containing a functional address identifying a data processing function to be performed on the data in said data message, data words which are to be transferred to said memory, and an end of message word, said method comprising:

receiving said data message containing said functional address;

utilizing said functional address of said data message to index said vector table, said vector table identifying an input control block corresponding to that particular functional address;

addressing said input control block identified by said functional address of said data message;

using said command words of said input control block to index said input message area;

storing the first data word of the data words of said data message in the first memory location of the input message area indicated by a first command word of said input control block; and storing subsequent words of the data words of said data message in memory locations contiguous to said first word until said input message area is full or the last word of said message is stored in said input message area.

7. The method of claim 6 which further comprises:

storing a second command word contained in said input control block in said vector table so as to update the index provided thereby for the next received message containing said functional address.

8. The method of claim 6 or 7 which further comprises:

storing said end of message word, which is indicative of whether said message has been received, in an input message termination queue for use by a software function which is to process said data.

* * * * *